Dec. 15, 1925.
J. J. TYLER
1,566,174
LEVELING APPARATUS
Filed Sept. 1, 1923 2 Sheets-Sheet 1
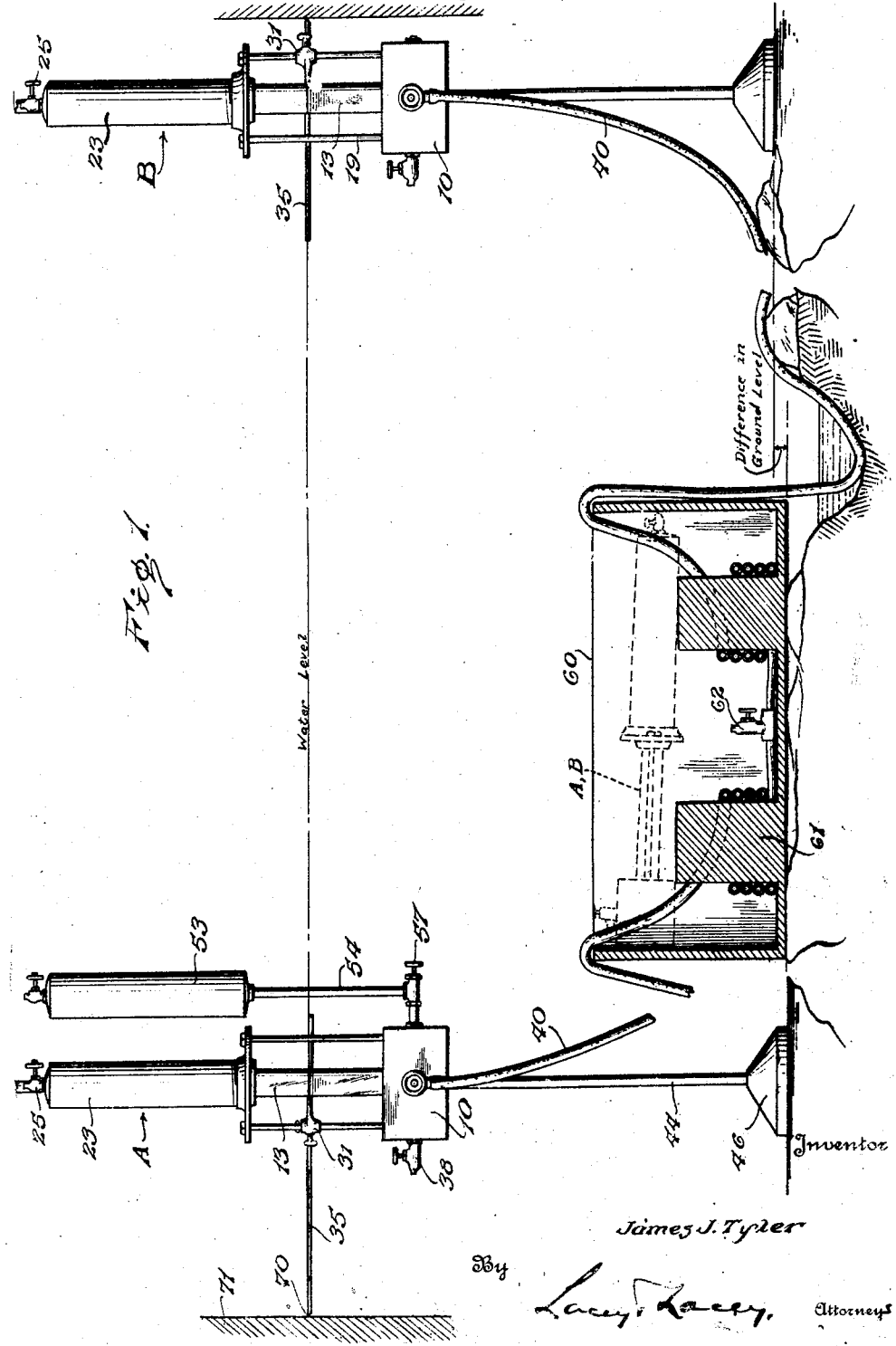
Inventor
James J. Tyler
By Lacey & Lacey, Attorneys

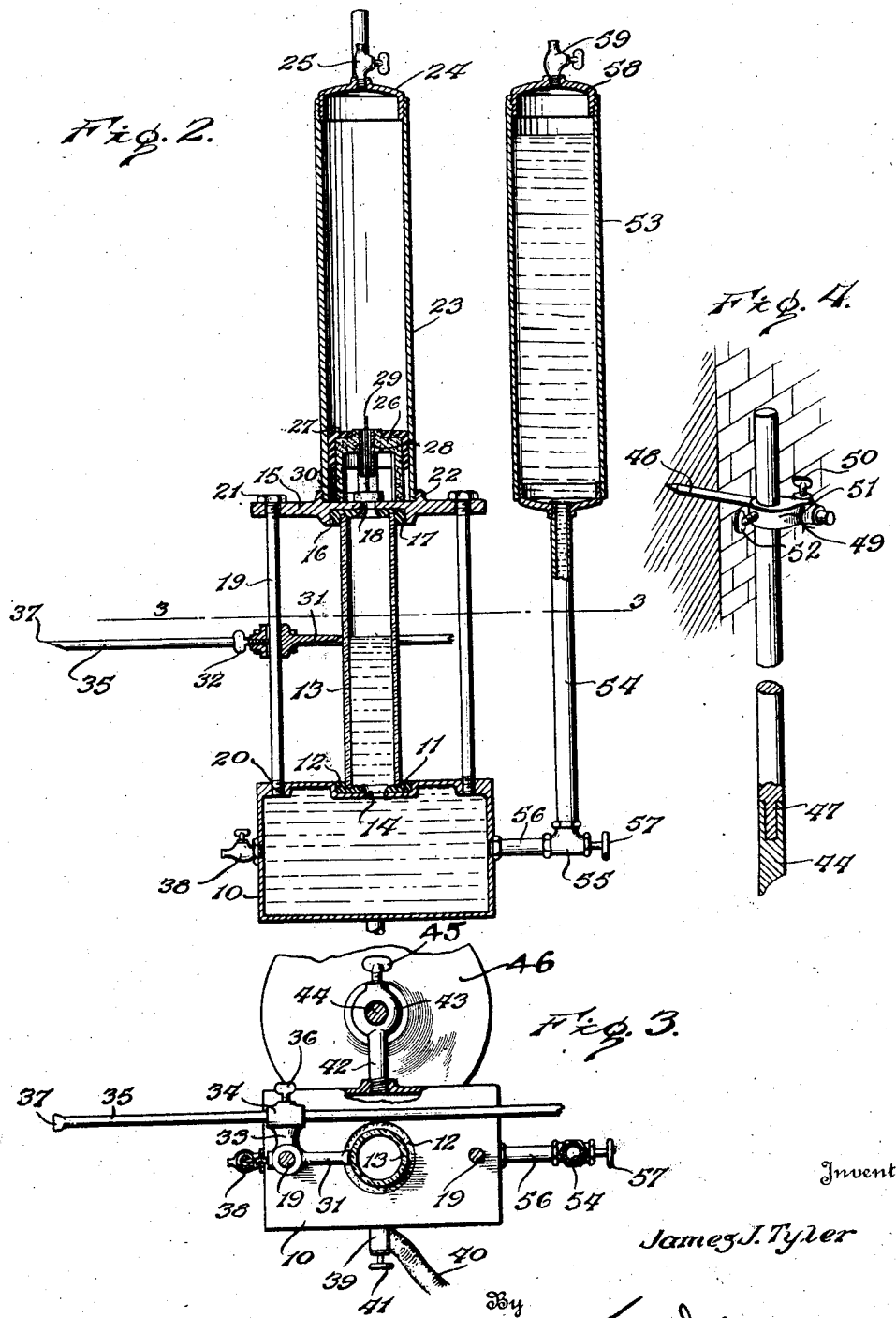

Patented Dec. 15, 1925.

1,566,174

UNITED STATES PATENT OFFICE.

JAMES J. TYLER, OF NEW YORK, N. Y.

LEVELING APPARATUS.

Application filed September 1, 1923. Serial No. 660,605.

*To all whom it may concern:*

Be it known that I, JAMES J. TYLER, a citizen of the United States, residing at New York, in the county of New York and State of New York, have invented certain new and useful Improvements in Leveling Apparatus, of which the following is a specification.

My invention relates to a leveling instrument, and the main object of the invention is to provide an instrument that will give very accurate readings and is convenient to carry about.

Another object of the invention is to construct the instrument in a simple manner thereby making the manufacturing cost very low.

One advantage of the instrument is that it can be used for leveling two points between which the view is obstructed, that is to say, from the inside to the outside of a wall or from one side of a building to a point on the other side thereof, or between two points on the ground obstructed by a hill or a house. The instrument can also be used to level two points only a few feet apart as well as for leveling points several hundred feet apart.

One embodiment of the invention is illustrated in the accompanying drawings wherein—

Figure 1 represents an elevation of a pair of instruments set up for finding the level between two separated walls;

Figure 2 is a vertical section of the instrument on a larger scale;

Figure 3 is a horizontal section taken along line 3—3 of Figure 2, and—

Figure 4 is a perspective view indicating the manner of suspending the instrument from a wall.

The device consists of a pair of instruments similar in construction, one of which is shown at A at the left of Figure 1 and designated as main, and the other is shown at B at the right of the same figure and designated as secondary. Each instrument consists of a reservoir 10 which is watertight and adapted to contain a liquid such as water, alcohol, or mercury. In the top of the reservoir 10 is a depression 11 containing a leather or similar packing 12 upon which the tube 13 rests and a small central opening 14 is provided in the depressed portion of the top as well as in the leather packing 12 to provide communication between the reservoir and the tube 13, permitting the liquid to rise up in the tube to about midway between its ends. The tube is held in upright position on the reservoir 10 by means of a plate 15 provided with a similar depression 16 and leather packing 17. This packing and plate are each provided with a central opening 18 preferably of smaller diameter than the diameter of the tube 13. Tie rods 19 tapped into the reservoir 10, as at 20, serve the purpose of holding the tube 13 in position between the plate 15 and the reservoir 10, as best seen in Figure 2, and the tie rods are for this reason provided with threads at their upper ends to receive nuts 21.

On the upper side of the plate 15 is provided an annular flange 22 which is threaded internally for engagement with the correspondingly threaded lower end of a cylinder 23, the latter serving as an overflow vessel for the reservoir. This cylinder has a closure or cap 24 preferably threaded on the upper end thereof and a valve 25 in the cap. Near the lower end of the cylinder 23 is a spider 26, the body portion of which is located a short distance above the plate 15 and a packing 27 of leather or other suitable material is fitted to the spider so as to make a tight connection between the same and the cylinder. Centrally located in the spider is a vent pipe 28 in alinement with the axis of the tube 13 and in the bore of this pipe is fitted loosely a spindle 29 which, at its lower end, carries a valve head 30 preferably of cork and normally closing the aperture 18 in the plate 15. This head is made very light so that the air in the tube 13 may be able to lift the same and escape through the vent pipe 28 into the overflow vessel 23 and to the atmosphere through the valve 25 when the latter is opened. The spider 26 forms a support for and serves to center the pipe 28 with respect to the port 18, while said pipe 28 not only acts as a vent but also forms a guide for the stem of the valve 30.

On one of the tie rods 19 is mounted an index or pointer 31 adapted to slide thereon, as best seen in Figure 2 and provided with a set screw 32 for holding the pointer in adjusted position on the rod. This pointer has a laterally extending arm 33 terminating in a sleeve 34 in which is slidably mounted a rod 35. A clamp screw 36 holds the rod 35 in adjusted position. The rod 35 terminates in a sharp edge 37 for setting the same against the leveling line or scribing such line on a wall in accordance with the position of the pointer 31 on the instrument, for which reason the edge 37 on the rod should coincide exactly in horizontal position with the top edge of the pointer 31. The rod 35 is preferably of sufficient length to cause the edge 37 thereof to extend a short distance from the instrument.

At 38 is shown a drain valve for the reservoir 10 and at 39 is a nipple adapted to receive the end of a flexible hose 40. This nipple has a valve 41 for manually closing the port leading to the hose 40. An arm 42 is secured in the wall of the reservoir 10 and is provided with a sleeve 43 adapted to slidably engage a post 44. A thumb screw 45 is provided in the sleeve 43 for securing the arm 42 and carrying the entire instrument on the post 44 and permitting adjustment thereof in a vertical plane. The post 44 is preferably provided with a foot 46 for supporting the instrument on the ground and in order to have sufficient length for this post, it is preferably made in sections suitably joined together as at 47, see Figure 4. Instead of supporting the instrument on the ground or floor it may be suspended from the wall, in which case a bar 48 is driven into the wall and upon this bar is carried a sleeve 49 and a set screw 50, and at right angles to the axis of the bar 48 the sleeve has a socket 51 into which the post 44 for the instrument may be inserted and clamped in position by a thumb screw 52.

The description so far applies to both the main and the secondary instruments, the two instruments being connected by the hose 40. The main instrument A in Figure 1, has in addition an auxiliary tank 53 mounted parallel therewith upon a pipe 54 carried on a T 55 connected with the reservoir 10 by means of a short pipe section 56. The T 55 has a closing valve 57 and the tank 53 has a cap 58 similar to the cap 24. The cap 58 is provided with a valve 59 which is opened when the liquid is to be drained from the auxiliary tank 53 into the reservoir 10. This tank has substantially the same length and diameter as the vessel 23 and is supported in upright position and parallel to the latter. The auxiliary tank 53 is filled with liquid to be used to replenish liquid in the reservoir 10 and tube 13 in both instruments.

For the sake of easy transportation of the instruments, a case or box 60 is provided and in the bottom of this box are secured spools 61 around which the hose is coiled. The hose is preferably made in two parts of equal length and joined together in the middle by a T 62 for simultaneous and easy draining of the two instruments instead of draining the same through the valves 38. The case 60 is also adapted to receive the two instruments with their stands or supports. With the parts packed in the said case 60, transportation of the instruments is made very easy and as the instruments are only about nine inches in length it is evident that their storage will be very compact.

In setting up the instruments for use the box is opened and the instruments removed after which the box or case is placed approximately central between the two points to be leveled so that an equal amount of hose is unwound from each of the spools 61.

Supposing now that leveling has to take place from the point 70 on the wall 71, the main instrument A is then set up near this wall and the secondary instrument B temporarily positioned close by. The instruments are supposed to be filled with liquid such as water for instance, to a sufficient height to show between the ends of the tube 13. In case insufficient water is provided in the instruments, more water can be supplied thereto by opening the valves 59, 25 and 57 until the water level in both instruments reaches about midway up the tubes 13, with the reading edge of the rod 35 registering against the line 70 on the wall. This is accomplished by the adjustment of the pointer 31 on the tie rod 19, and the water level in the tube 13 must now coincide with the pointer 31 or, if not, water must be drained through the valve 38 or supplied from the auxiliary tank 53. As soon as the water level and pointer coincide in the instrument A, the pointer 31 in the instrument B is set to register with the level of the liquid in the tube. It should be observed that the pointer 31 in instrument A must not be shifted while this adjustment takes place.

The instrument B is now taken to the place where a leveling line is to be marked to agree with the leveling line 70 at instrument A while the latter remains in its position at this point. The case 60 is positioned about half way between the instruments and a sufficient amount of hose 40 uncoiled from each of the spools 61 and laid on the ground.

As, however, the flexible hose 40 is apt to change its cross section somewhat when taken out of the case 60 and laid on the ground which might be warmer or colder than the temperature in the case, and as, furthermore, the water might not be free from air and may itself expand or contract, it is evident that the water level may change in the tubes 13 of the instruments. In such a case, the water level in instrument A is corrected to agree with the pointer 31 of this instrument by draining or filling the reservoir 10 by means of the drain valve 38 or the auxiliary tank 53. It will generally take only a few minutes time for the level to settle and as soon as the level in instrument A becomes steady after the filling or the draining of the liquid, the pointer 31 of instrument B is set to agree with the level of the liquid in the tube 13 of this instrument. A line can now be scribed along the sharp edge 37 of the rod 35 in instrument B and the leveling is accomplished. It is evident that it is entirely immaterial whether instrument B is placed on its support on the ground, as indicated to the right of Figure 1 where the ground level is higher than at instrument A, or suspended from a wall or merely carried in the operator's hand when being used. It is merely for convenience when the ground is smooth or a bracket or the like is available, that the instrument is supported in this manner. The instrument is self-contained and is not dependent upon any exterior support. In the case of instrument A, however, which remains stationary at the starting point, it is well to have it supported on a stand or suspended from a ceiling or a wall.

The instrument is easy to manipulate and can be used by surveyors, architects, builders, plumbers, electricians, pipefitters, or by anyone who needs to find a level between two points.

The instrument can be used for distances of only a few feet to several hundred feet apart. One of the advantages over ordinary surveying instruments is that it is not necessary to observe the pointer of the main instrument from the secondary instrument or vice versa and the leveling is bound to be true. An error of the direction may easily occur if an ordinary surveying instrument is not properly level, this error increasing with the distance between the two points to be leveled. It will also be evident that the setting up of this device can be accomplished much quicker than with an ordinary instrument, as the latter requires at least fifteen minutes or more to be leveled whereas only a couple of minutes are needed to allow the liquid in this device to settle.

Having thus described the invention, what is claimed as new is:

1. A leveling instrument comprising coacting reservoirs for liquid, each being provided with a draining device, suitable intercommunication between said reservoirs, an indicating tube mounted on each of said reservoirs and opening into the same, an index for each of said tubes, means for supporting the indices, means for directly filling one of said reservoirs, a support for each of said reservoirs having slidably adjustable connection therewith, said support including a rod, a bracket secured on each of said reservoirs and slidably engaging said rod, a clamp screw in said bracket for said rod, and means whereby said indices may be adjusted vertically of the tubes.

2. A leveling instrument comprising coacting reservoirs for liquid, suitable interacting communication between said reservoirs, an indicating tube mounted on each of said reservoirs and opening into the same, an index for each of said tubes, means for supporting the indices, means for directly filling one of said reservoirs, a support for each of said reservoirs having slidably adjustable connection therewith, a vessel for each reservoir into the bottom of which said tube opens, and elements adapted to secure the reservoir tube and vessel together.

3. A leveling instrument comprising coacting reservoirs for liquid, each being provided with a draining device, suitable intercommunication between said reservoirs, an indicating tube mounted on each of said reservoirs and opening into the same, an index for each of said tubes, means for supporting the indices, means for directly filling one of said reservoirs, a support for each of said reservoirs having slidably adjustable connection therewith, an overflow vessel for each reservoir into which said tube opens, elements adapted to secure the reservoir, tube and vessel together, a closure cap for said vessel provided with a valve, the bottom of said vessel being provided with a port, and a valve for normally closing said port.

4. A leveling instrument comprising coacting reservoirs for liquid, each being provided with a draining device, suitable intercommunication between said reservoirs, an indicating tube mounted on each of said reservoirs and opening into the same, an index for each of said tubes, means for supporting the indices, means for directly filling one of said reservoirs, and a support for each of said reservoirs having slidably adjustable connection therewith; said filling means including an auxiliary tank, a pipe connecting said tank with one of said reservoirs, and a valve for said pipe, a closure cap for said auxiliary tank, said auxiliary tank being adapted for gravity filling of said reservoir.

5. A leveling instrument comprising coacting reservoirs for liquid, each being provided with a draining cock, a flexible hose connection between said reservoirs, a transparent indicating tube mounted on each of the reservoirs and opening into the same, a support for each of said reservoirs including a rod, a bracket secured on each of said reservoirs and slidably engaging said rod, a clamp screw in said bracket for adjustably positioning the reservoir on said rod, an index for each tube, means for adjustably supporting the indices in juxtaposition to the tubes, an auxiliary vessel for each reservoir into the bottom of which said tube opens, elements including tie-rods adapted to secure the reservoir, tube and vessel together, a closure cap for said vessel provided with a valve, the bottom of said vessel being provided with a port, and a valve for said port; filling means for one of said reservoirs including an auxiliary tank, a pipe connecting said tank with said reservoir, and a valve for said pipe, and a closure cap for said auxiliary tank, said auxiliary tank being adapted for gravity filling of said reservoir.

In testimony whereof I affix my signature.

JAMES J. TYLER. [L. S.]